(12) United States Patent
Saito et al.

(10) Patent No.: US 8,643,854 B2
(45) Date of Patent: Feb. 4, 2014

(54) IMAGE FORMING APPARATUS AND PRINT CONTROL METHOD USED THEREIN

(75) Inventors: Kazuma Saito, Takahagi (JP); Takeshi Fujita, Edogawa-ku (JP); Hideaki Matsui, Kawasaki (JP); Daisuke Okada, Wako (JP)

(73) Assignee: Ricoh Company, Limited, Tokyo (JP)

( * ) Notice: Subject to any disclaimer, the term of this patent is extended or adjusted under 35 U.S.C. 154(b) by 1515 days.

(21) Appl. No.: 12/030,508

(22) Filed: Feb. 13, 2008

(65) Prior Publication Data

US 2008/0198404 A1    Aug. 21, 2008

(30) Foreign Application Priority Data

Feb. 14, 2007 (JP) ................................ 2007-033631
Jan. 11, 2008 (JP) ................................ 2008-003798

(51) Int. Cl.
H04N 1/00 (2006.01)
G06F 3/12 (2006.01)
H04N 15/00 (2006.01)
H04K 1/00 (2006.01)
B41J 5/40 (2006.01)

(52) U.S. Cl.
USPC ........ 358/1.13; 358/437; 358/1.15; 358/1.16; 358/448; 400/582; 400/185; 400/63

(58) Field of Classification Search
USPC ........ 400/5, 582, 185, 63; 358/437, 1.1, 1.13, 358/1.14, 1.17, 1.16, 1.18; 725/149
See application file for complete search history.

(56) References Cited

U.S. PATENT DOCUMENTS

| | | | | |
|---|---|---|---|---|
| 3,940,746 A | * | 2/1976 | Vittorelli | 400/5 |
| 4,712,139 A | * | 12/1987 | Kato | 358/439 |
| 5,377,016 A | * | 12/1994 | Kashiwagi et al. | 358/403 |
| 5,638,192 A | * | 6/1997 | Yoshida | 358/530 |
| 5,740,028 A | * | 4/1998 | Sugiyama et al. | 725/149 |
| 5,740,497 A | * | 4/1998 | Yamada et al. | 399/87 |
| 5,832,301 A | * | 11/1998 | Yamaguchi | 358/1.1 |
| 5,859,956 A | * | 1/1999 | Sugiyama et al. | 358/1.13 |

(Continued)

FOREIGN PATENT DOCUMENTS

JP 10-109465 4/1998
JP 11-143655 5/1999

(Continued)

OTHER PUBLICATIONS

Office Action issued Dec. 28, 2011, in Japanese Patent Application No. 2008-003798.

*Primary Examiner* — Akwasi M Sarpong
(74) *Attorney, Agent, or Firm* — Oblon, Spivak, McClelland, Maier & Neustadt, L.L.P.

(57) ABSTRACT

An image forming apparatus, connected to an information processing device via a network, includes a receiving section, a memory, an interpretation section, and a transmission section. The receiving section receives a plurality of pieces of print data from the information processing device via the network. The plurality of pieces of print data include first print data for normal printing, second print data for interruption printing, and third print data. The memory has first to third buffers. The first and second buffers store the first and second print data, respectively. The third buffer stores the third print data during execution of the interruption printing of the second print data. The interpretation section interprets the plurality of pieces of print data. The transmission section transmits a reply message to the information processing device in accordance with a result of the third print data interpreted by the interpretation section.

10 Claims, 9 Drawing Sheets

(56) References Cited

U.S. PATENT DOCUMENTS

| | | | |
|---|---|---|---|
| 6,058,249 A * | 5/2000 | Matsuda et al. | 358/1.14 |
| 6,084,688 A * | 7/2000 | Stumbo et al. | 358/1.17 |
| 6,333,789 B1 * | 12/2001 | Shima | 358/1.15 |
| 6,341,907 B1 * | 1/2002 | Katsuyoshi | 400/582 |
| 6,906,813 B1 * | 6/2005 | Tuchitoi et al. | 358/1.14 |
| 7,248,385 B2 * | 7/2007 | Murakami et al. | 358/1.18 |

FOREIGN PATENT DOCUMENTS

| | | |
|---|---|---|
| JP | 2000-272205 | 3/2000 |
| JP | 2001-246811 | 9/2001 |
| JP | 2001-320528 | 11/2001 |

\* cited by examiner

IMAGE FORMING APPARATUS AND PRINT CONTROL METHOD USED THEREIN

CROSS-REFERENCE TO RELATED APPLICATIONS

The present patent application claims priority under 35 U.S.C. §119 from Japanese Patent Application Nos. JP2007-033631 filed on Feb. 14, 2007 and JP2008-003798 filed on Jan. 11, 2008 in the Japan Patent Office, the entire contents of each of which are hereby incorporated herein by reference.

BACKGROUND OF THE INVENTION

1. Field of the Invention

The present invention generally relates to image forming apparatuses and print control methods used therein, and more specifically, to an image forming apparatus capable of executing interruption printing requested through a network and a print control method used therein.

2. Description of the Background

Image forming apparatuses are used as printers, facsimile machines, copiers, and multi-functional devices, for example. Some image forming apparatuses are capable of forming desired images based on print requests transmitted from a plurality of host computers (hereinafter "host" or "hosts") through a network. Such image forming apparatuses may process the print requests while controlling the printing processes using a given print control method.

For example, one conventional network printer can be shared by a plurality of hosts, which are connected to a network, and may sequentially receive print requests from such hosts via the network. If it takes a relatively long time to process one print request, a subsequent print request cannot be efficiently processed. Hence, when receiving a subsequent print request having a higher priority during execution of one printing process, such a conventional network printer performs interruption printing based on the subsequent print request to reduce user waiting time.

To execute such interruption printing, such a conventional network printer is provided with a sheltering buffer in which to temporarily store print data. When receiving an interruption printing request of second print data while executing a printing process of first print data, such a conventional network printer temporarily stores the first print data in the sheltering buffer. The conventional network printer also stores the second print data in a transmission-and-reception buffer and executes a printing process based on the second print data. After the interruption printing, the conventional network printer reads the first print data from the sheltering buffer and resumes the printing process of the first print data.

However, such a conventional print control method to execute interruption printing has certain disadvantages.

Specifically, when such buffers have a sufficient capacity, all print requests are received and processed. However, when such buffers have a limited capacity, at most only two print requests may be processed, for example. When a subsequent print request is sent from a host during interruption printing, such a conventional network printer cannot secure sufficient free space in the buffers and thus cannot receive or reply to the subsequent print request. Meanwhile, the host cannot obtain information about the status of the network printer.

In particular, in a case of executing a printing process according to a protocol in which bi-directional communication is needed between the host and the printer, when an interruption printing is executed and the buffers become short of free space, the printer cannot receive subsequent print data, interpret commands in the print data, and reply to the host. In such a state, while the buffers in the printer are filled with the preceding print data, the host may be forced to continuously wait for the reply, thereby giving the user of the host a false impression that the printer is stalling.

In this regard, a further description is given with reference to FIGS. 1A and 1B. FIGS. 1A and 1B illustrate cases in which, while executing normal printing in accordance with a first print request transmitted according to a direct print protocol in which the printer does not need to reply to the host, the printer receives a second print request having a higher priority according to a bi-directional print protocol in which the printer needs to reply to the host. In each of FIGS. 1A and 1B, while the printer is executing the interruption printing in response to the second print request having such a higher priority, a third print request is transmitted to the printer according to the bi-directional communication protocol.

In this regard, the priority of printing operations is classified into two levels: a higher priority for the interruption printing and a normal priority for normal printing. FIG. 1A illustrates an operation executed with a sheltering buffer while FIG. 1B illustrates an operation executed with a transmission-and-reception buffer for interruption printing.

In each of FIGS. 1A and 1B, when the interruption printing is not requested, a series of print data are stored in order in a transmission-and-reception buffer for normal printing and are printed in the reception order. When receiving an interruption printing request of second print data while executing a normal printing process of first print data, the printer stores the first print data in the sheltering buffer of FIG. 1A or the transmission-and-reception buffer for interruption printing of FIG. 1B, suspends the normal printing process of the first print data, and executes the interruption printing of the second print data.

In this regard, since such print data includes a parameter indicating its printing priority, a communication interface (I/F) checks the parameter and determines whether or not the interruption printing should be executed.

When a subsequent print request for third print data is transmitted to the printer while executing the interruption printing of the second print data, the printer cannot receive the third print data and therefore cannot interpret a command included in the third print data. When a bi-directional communication protocol as described above is used, the host may be forced to continuously wait for a reply transmitted from the printer.

SUMMARY OF THE INVENTION

Exemplary embodiments of the present invention provide an image forming apparatus capable of replying to a print request from a host through a network while executing interruption printing.

In one exemplary embodiment of the present invention, an image forming apparatus, connected to an information processing device via a network, includes a receiving section, a memory, an interpretation section, and a transmission section. The receiving section receives a plurality of pieces of print data from the information processing device via the network. The plurality of pieces of print data include first print data for normal printing, second print data for interruption printing, and third print data. The memory has a first buffer, a second buffer, and a third buffer. The first buffer stores the first print data for normal printing received by the receiving section. The second buffer stores the second print data for interruption printing received by the receiving section. The third buffer stores the third print data received by the receiving section during execution of the interruption printing of the second print data. The interpretation section interprets the plurality of pieces of print data received by the receiving section. The transmission section transmits a reply message to the information processing device in accordance with a result of the third print data interpreted by the interpretation section.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1A:
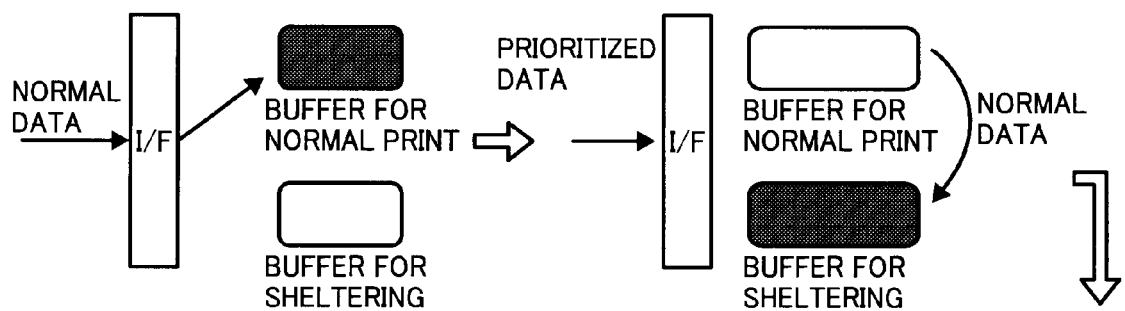
FIGS. 1A and 1B illustrate conventional interruption printing operations.
Figure 1A:
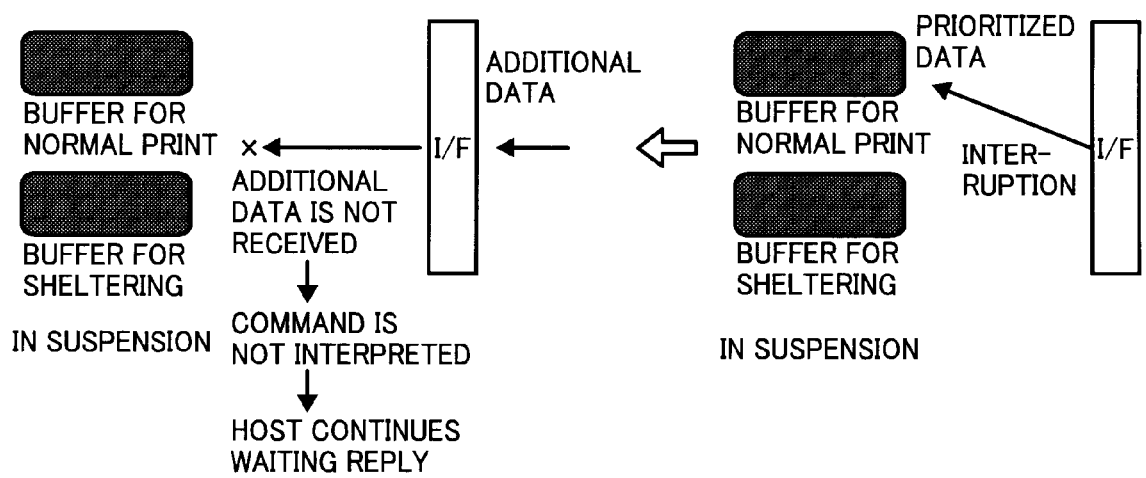
Figure 1B:
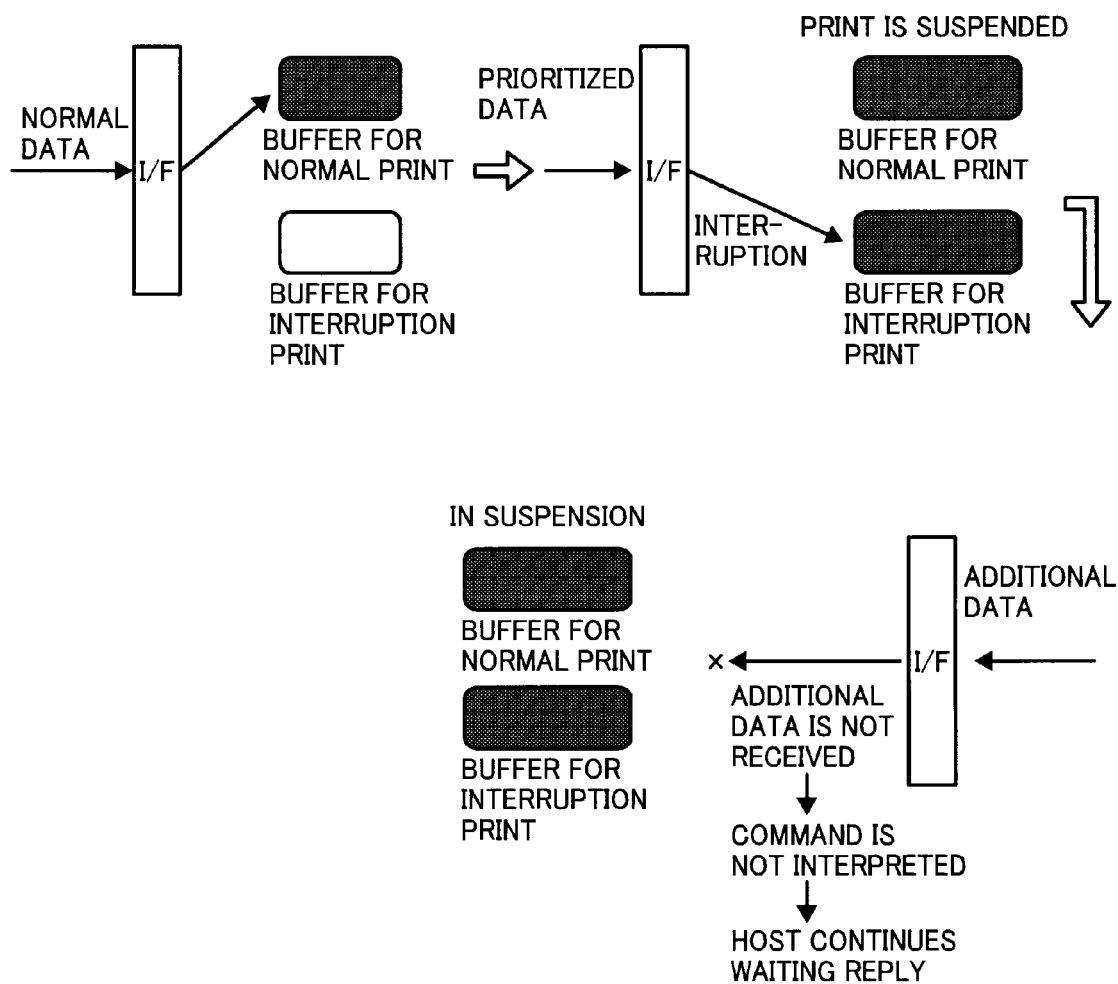

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION OF EXEMPLARY EMBODIMENTS

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve the same result. For the sake of simplicity, the same reference numerals are used in the drawings and the descriptions for the same materials and constituent parts having the same functions, and redundant descriptions thereof are omitted.

Exemplary embodiments of the present disclosure are now described below with reference to the accompanying drawings. It should be noted that, in a later-described comparative example, exemplary embodiment, and alternative example, the same reference numerals are used for the same constituent elements such as parts and materials having the same functions, and redundant descriptions thereof are omitted.

According to embodiments of the present invention, when receiving print data from a host during interruption printing, an image forming apparatus stores the print data in a transmission-and-reception buffer allocated for reply to the host, analyzes a command included in the print data, and, when a bi-directional communication protocol is used, transmits a reply command to the host.

Figure 2A:
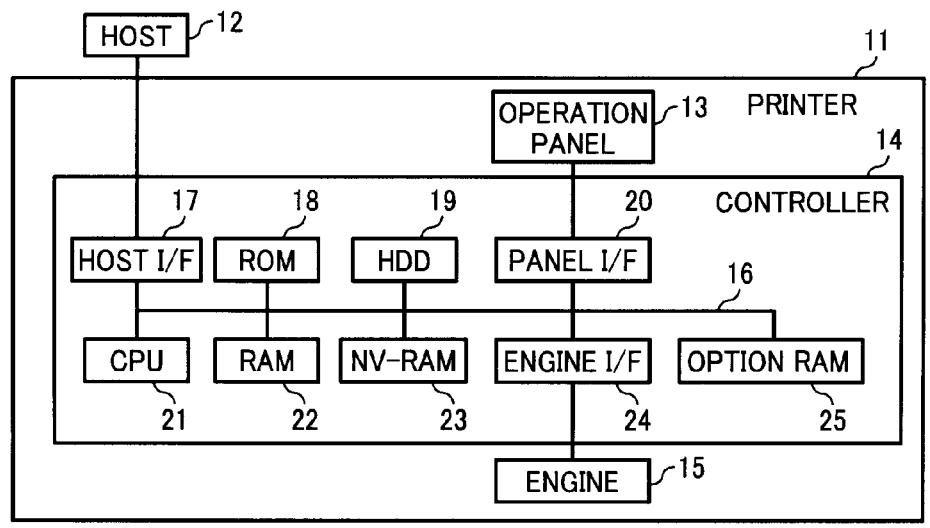
FIGS. 2A and 2B are block diagrams illustrating hardware and functional configurations of an image forming apparatus according to an exemplary embodiment of the present invention.
Figure 2B:
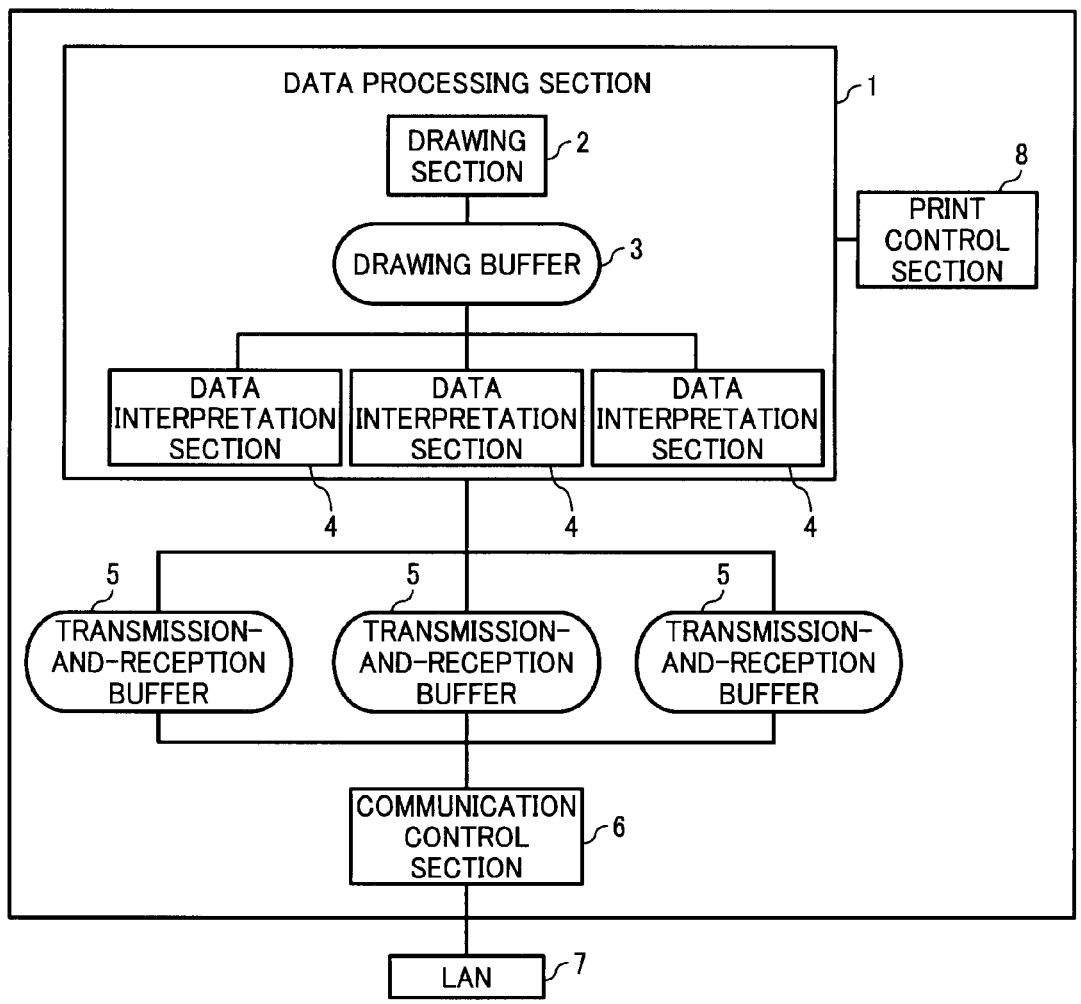

FIGS. 2A and 2B are block diagrams illustrating configurations of an image forming apparatus according to an exemplary embodiment of the present invention. FIGS. 2A and 2B illustrate hardware and functional configurations, respectively, of the image forming apparatus.

Figure 3A:
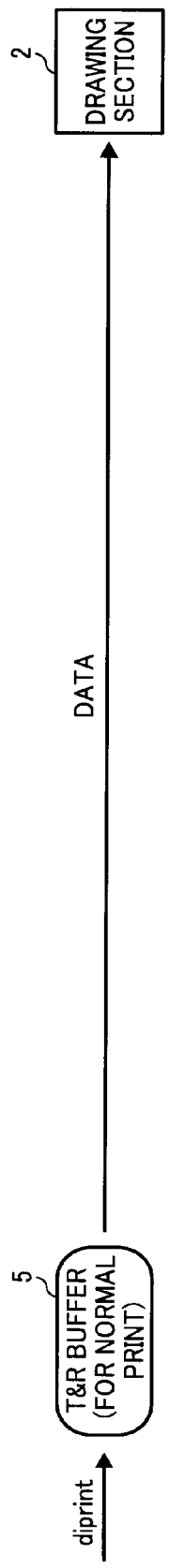
FIGS. 3A, 3B, and 3C are illustrations for explaining a process when subsequent print data is transmitted to the image forming apparatus of FIGS. 2A and 2B during interruption printing.
Figure 3B:
Figure 3C:
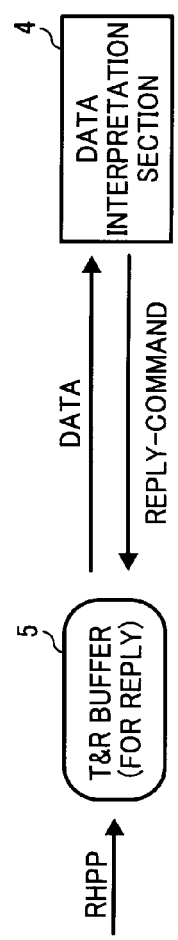

FIGS. 3A to 3C illustrate a process when subsequent print data is transmitted to the image forming apparatus of FIGS. 2A and 2B during interruption printing.

Figure 4:
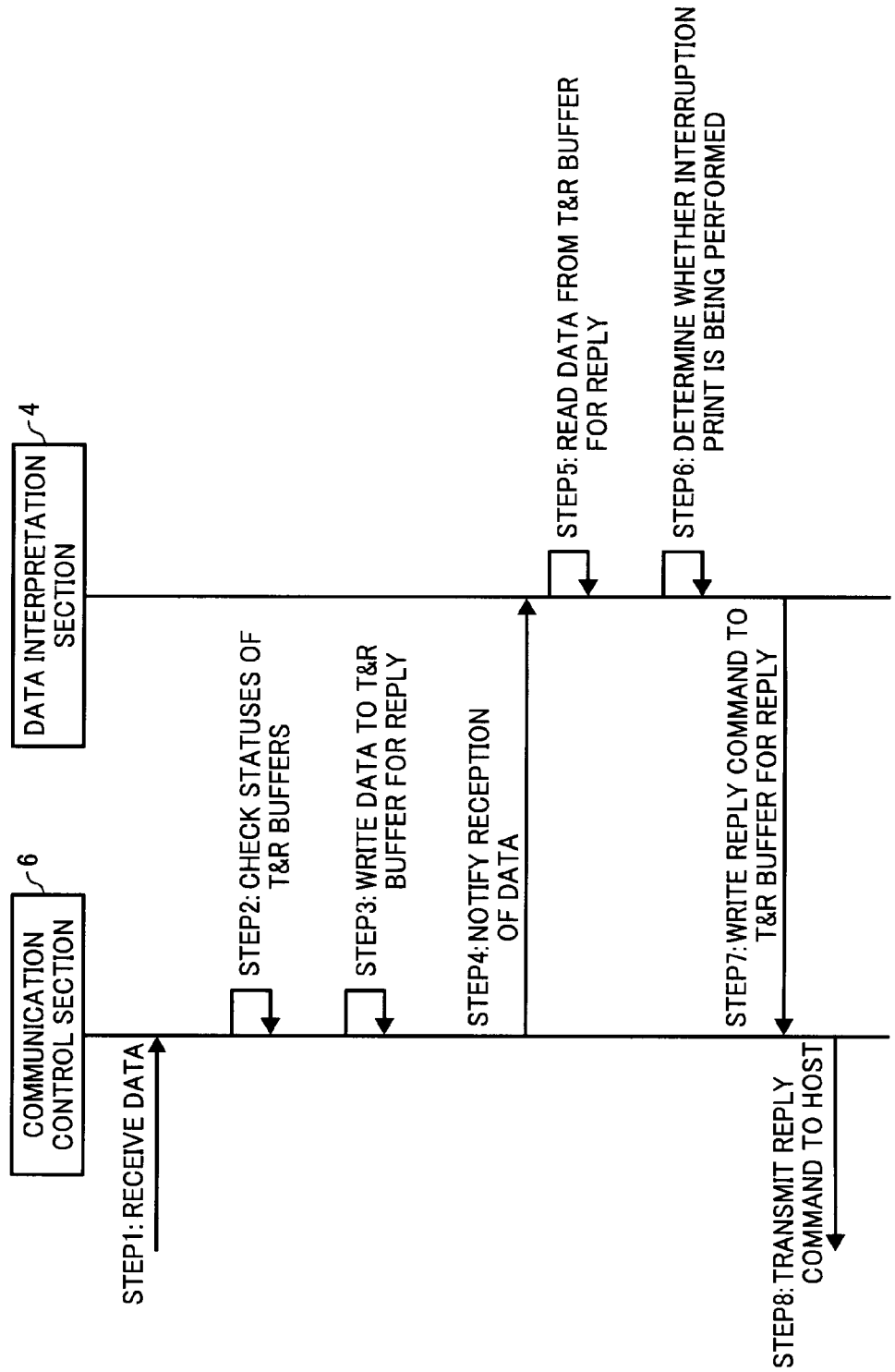
FIG. 4 is a timing chart observed when print data is received according to RHPP (Ricoh Host Print Protocol) during interruption printing in the image forming apparatus of FIGS. 2A and 2B.

FIG. 4 is a timing chart observed when the image forming apparatus receives print data according to RHPP (Ricoh host print protocol) during interruption printing.

Figure 5:
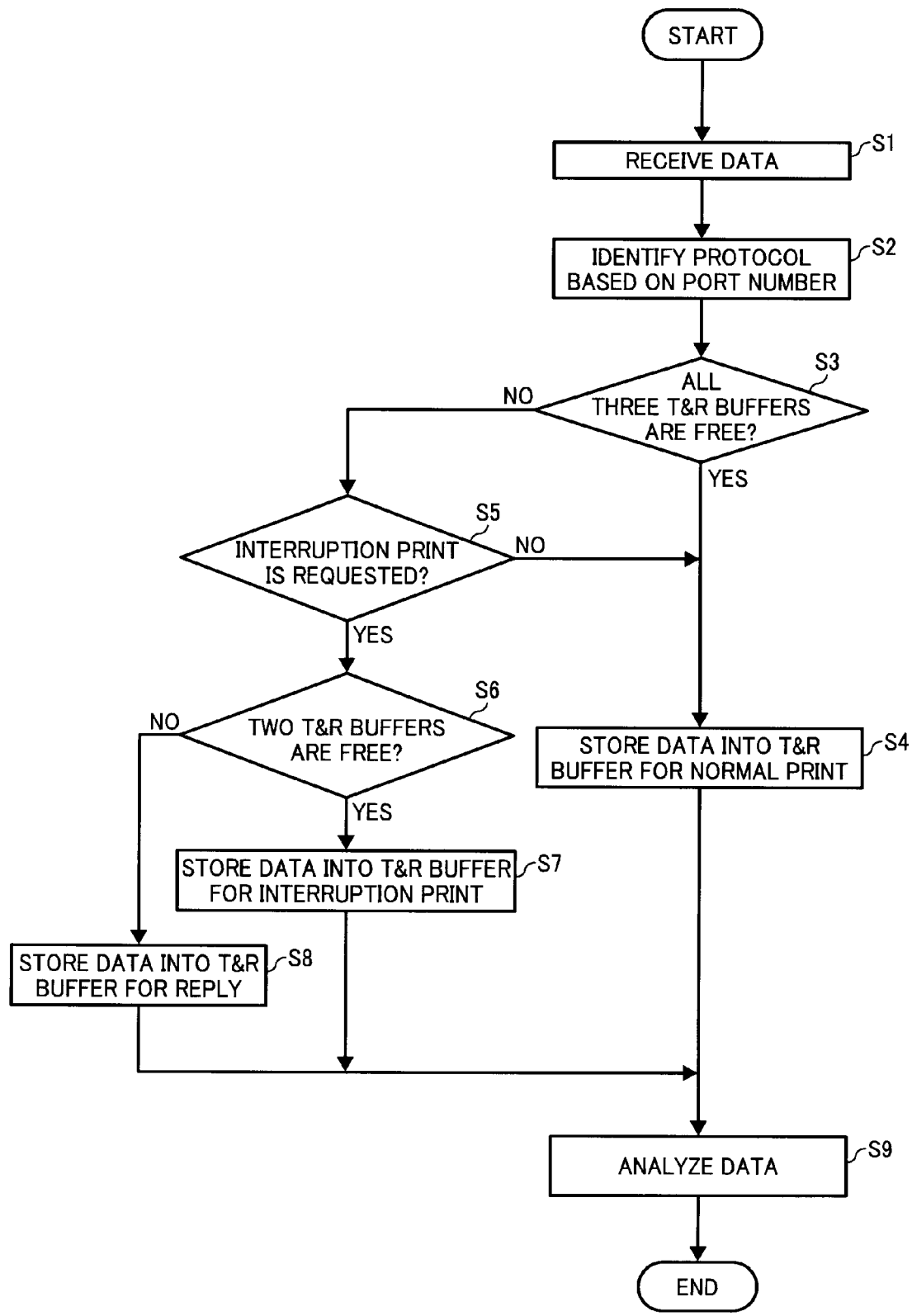
FIG. 5 is a flowchart illustrating a processing procedure executed when using a protocol in which a bi-directional communication is needed between the image forming apparatus of FIGS. 2A and 2B and a host.
Figure 6:
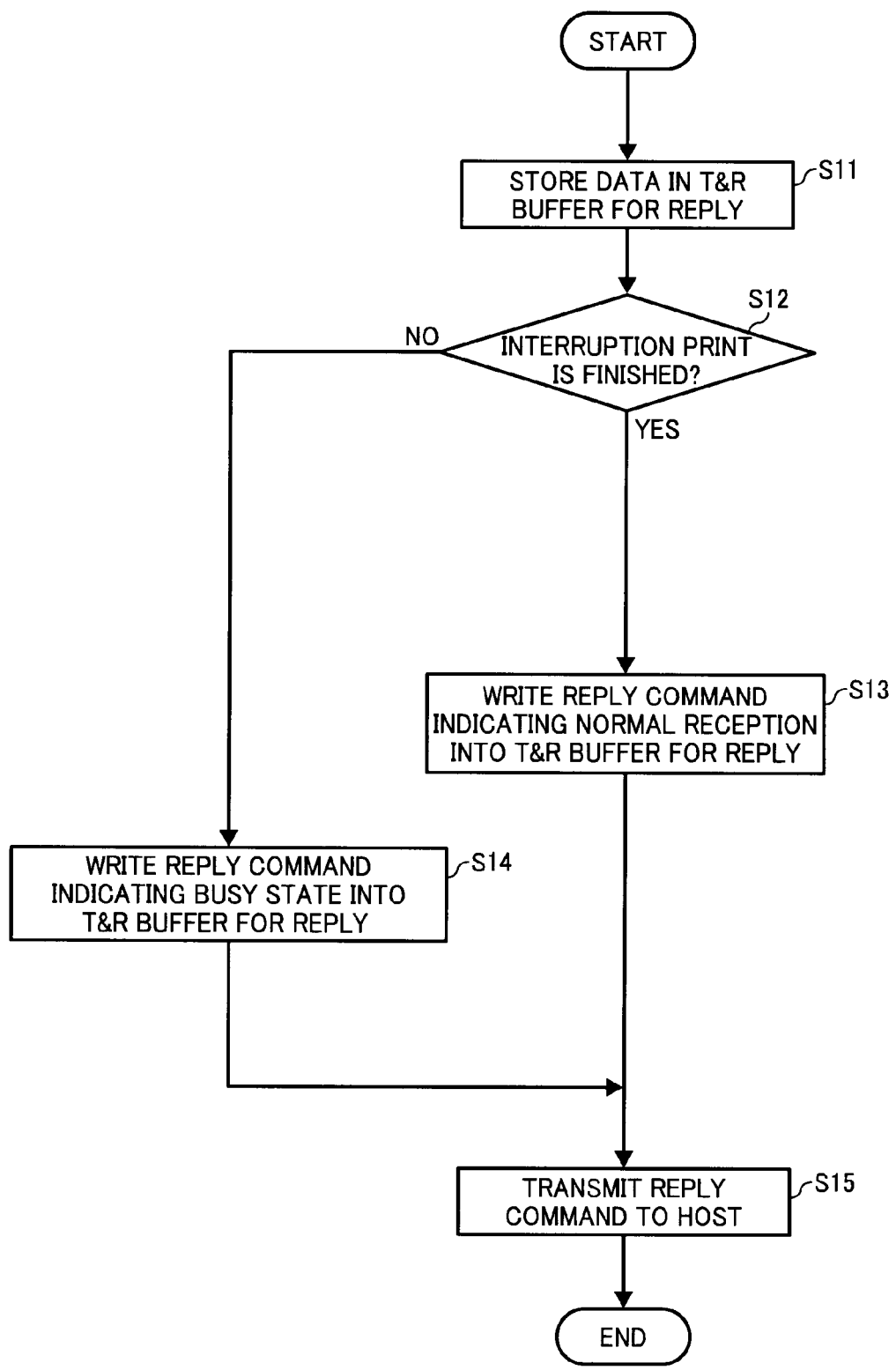
FIG. 6 is a flowchart illustrating a processing procedure executed when print data is received according to RHPP during interruption printing in the image forming apparatus of FIGS. 2A and 2B.

FIG. 5 is a flowchart illustrating a processing procedure executed when the image forming apparatus receives print data according to a protocol in which bi-directional communication is needed between the image forming apparatus and a host. FIG. 6 is a flowchart illustrating a processing procedure when the image forming apparatus receives print data according to RHPP (Ricoh Host Print Protocol).

In the following description, the image forming apparatus is described as a printer 11 with reference to FIG. 2A. It should be noted that the image forming apparatus is not limited to such a printer, and may be a copier, facsimile, multi-functional device, or any other suitable apparatus.

As illustrated in FIG. 2A, the printer 11 includes an operation panel 13, a controller 14, and an engine 15. The hardware configuration of the printer 11 is basically similar to that of a conventional printer and therefore is briefly described below.

The operation panel 13 functions as a man-machine interface between the printer 11 and its user, and includes keys, a touch panel, an indicator such as a light-emitting diode (LED) or liquid crystal display (LCD) indicator, a display such as a liquid crystal display, and a speaker.

The engine 15 scans a laser beam over a photoconductor according to image data and control signals transmitted from the controller 14 to form an electrostatic latent image on the photoconductor. The engine 15 also develops the latent image, feeds a sheet from a sheet feed unit, and forms a desired image on the sheet by transfer and fixing processes. It should be noted that the image forming method of the engine 15 is not limited to such an electrostatic method and may be an LED, inkjet, or any other suitable method.

The controller 14 generally controls the engine 15 according to print data transmitted from a host 12. As illustrated in FIG. 2A, the controller 14 includes a bus 16, a host interface (I/F) 17, a read only memory (ROM) 18, a hard disk drive (HDD) 19, a panel I/F 20, a central processing unit (CPU) 21, a random access memory (RAM) 22, a non-volatile random access memory (NV-RAM) 23, an engine I/F 24, and an optional RAM 25, for example.

The host I/F 17 is an interface for print data transmitted from the host 12 to the printer 11 and reply signals from the printer 11 to the host 12. The ROM 18 stores programs for managing data stored in the controller 14 and for controlling peripheral modules and print font data. The HDD 19 is capable of storing a large amount of data and files. The panel I/F 20 is an interface for signals used to switch statuses, modes, and fonts of the printer 11.

The CPU 21 processes, according to a program stored in the ROM 22, print data transmitted from the host 12. The RAM 22 functions as a work memory for the CPU 21, a buffer for temporarily storing print data transmitted from the host 12, and a bit map memory for storing image data, which are converted from the print data stored in the buffer. The NV-RAM 23 serves as a non-volatile memory capable of retaining data while the power of the printer 11 is turned off. The engine I/F 24 is an interface for control signals transmitted from the controller 14 to the engine 15 and status signals transmitted from the engine 15 to the controller 14. The optional RAM 25 is an optional memory for storing data other than the data stored in the RAM 22 and the NV-RAM 23.

In FIG. 2B, a data processing section 1 controls the entire printer 11 and image forming operation via the CPU 21 and the ROM 18 illustrated in FIG. 2A. A drawing section 2 executes a drawing process to convert print data described in PDL (page description language) into bitmap image data. A drawing buffer 3 is a memory to temporarily store the print data read from three transmission-and-reception buffers 5, described below.

Data interpretation sections 4 interpret commands and data stored in the transmission-and-reception buffers 5. The three transmission-and-reception buffers 5 are memories to temporarily store print data and reply commands. A communication control section 6 receives and transmits information from and to the host 12 via a network. A LAN (local area network) 7 is a network through which the printer 11 is connected to the host 12. A print control section 8 controls the engine 15.

As illustrated in FIG. 2B, the printer 11 has the three transmission-and-reception buffers 5 and the corresponding three data interpretation sections 4. The three transmission-and-reception buffers 5 are allocated for normal printing, interruption printing, and reply, respectively. It should be noted that the three transmission-and-reception buffers 5 are functionally defined and do not necessarily correspond to three hardware memories. When the interruption printing has a plurality of priority levels, a plurality of interruption printing jobs are assigned to one transmission-and-reception buffer 5.

As described above, the three data interpretation sections 4 are provided to correspond to the three transmission-and-reception buffers 5. Such a configuration is advantageous in design simplicity compared to a configuration in which one data interpretation section interprets all print data stored in the three transmission-and-reception buffers 5.

The three data interpretation sections 4 are functionally defined and one re-enterable module may be configured to operate by time division as the three data interpretation sections 4.

In the following description, RHPP is used as an example of a protocol in which bi-directional communication is needed between the printer 11 and the host 12 during printing operation. A direct print (diprint) protocol is used as an example of a protocol according to which bi-directional communication is not needed between the host 12 and the printer 11 during printing operation.

According to RHPP, the printer 11 communicates with the host 11 in a bi-directional manner. In executing a printing process, the printer 11 analyzes commands included in print data from the host 12 and transmits, to the host 12, a reply command indicating completion of sheet ejection for each page. Such a reply command may include various kinds of information, for example, success of device acquisition or completion of drawing.

The communication control section 6 identifies the type of protocol based on a port number designated in the print data transmitted from the host 12. If a certain port number is designated in the print data, the communication control 6 determines that RHPP is in use. The data interpretation section 4, which is capable of interpreting RHPP commands, interprets print data stored in the transmission-and-reception buffer 5 and writes the reply command to the transmission-and-reception buffer 5.

The print data transmitted according to RHPP includes an RHPP command. The RHPP command is removed from the print data, and the resultant print data is stored in the drawing buffer 3 communicating with the data interpretation section 4 and the drawing section 2.

The drawing section 2 executes a drawing process based on the print data and causes the engine 15 to perform printing via the print control section 8. The data interpretation sections 4 are provided between the drawing section 2 and the host 12, so that the drawing section 2 does not need to analyze data that is included in the RHPP command and is not related to the drawing process. Thus, the drawing section 2 can execute the drawing process using a conventional configuration. The relevant data interpretation section 4 creates the reply command and transmits the print data, not including the RHPP command, to the drawing section 2.

In the present exemplary embodiment, the interruption printing has a priority one level higher than the normal printing. Therefore, while one interruption printing job is executed, another interruption printing job is not executed. In other words, while executing interruption printing, the printer 11 does not accept a subsequent print request regardless of the priority level.

On the other hand, according to RHPP, since the printer 11 needs to return a reply command to the host 12, the printer 11 stores print data in the transmission-and-reception buffer 5 allocated for reply. The relevant data interpretation section 4 interprets the print data, writes the reply command into the transmission-and-reception buffer 5 for reply, and transmits the reply command to the host 12 via the communication control section 6.

Before writing the reply command into the transmission-and-reception buffer 5 for reply, the relevant data interpretation section 4 checks a status of the transmission-and-reception buffer 5 for the interruption printing and determines whether or not the interruption printing is finished. If the interruption printing is being performed, the relevant data interpretation section 4 writes a reply command indicating a busy state into the transmission-and-reception buffer 5 for reply. Alternatively, if the interruption printing is finished, the data interpretation section 4 writes a reply command indicating normal reception of a command from the host 12 into the transmission-and-reception buffer 5 for reply.

If the priority level of the print data is high, the printer 11 uses the transmission-and-reception buffer 5 for reply to start interruption printing. Alternatively, if the priority level of the print data is normal, starting from the next communication the printer 11 switches a counterpart for receiving print data from the transmission-and-reception buffer 5 for reply to the transmission-and-reception buffer 5 for normal printing.

No specific one of the three transmission-and-reception buffers 5 is always used for normal printing. Likewise, the other two transmission-and-reception buffers 5 are not always used for interruption printing and reply. The three transmission-and-reception buffers 5 are used in the order in which the transmission-and-reception buffers 5 are freed, and thus one of the three specific transmission-and-reception buffers 5 is not necessarily used for reply to the host 12. By switching the usages of the three transmission-and-reception buffers 5 depending on their availabilities, each transmissionand-reception buffer 5 is appropriately allocated for normal printing, interruption printing, or reply. The communication control section 6 determines which role should be allocated to one transmission-and-reception buffer 5 based on the availability of each transmission-and-reception buffer 5.

For example, when one memory is functionally divided to be used as the three transmission-and-reception buffers 5, it is allowed that most spaces of the memory are used by the buffer for normal printing. However, it is not allowed that the buffer for reply cannot reply to the host 12 due to lack of free space. Hence, a higher priority is given to secure the buffer for reply in the memory, and thus a relatively small amount of buffer memory can be effectively used.

Next, a processing procedure executed when print data is received during interruption printing is described with reference to FIGS. 3A to 3C.

As illustrated in FIG. 3A, when first print data is transmitted according to the diprint protocol, the first print data is stored in the transmission-and-reception buffer 5 for normal printing. The drawing section 2 reads the first print data from the transmission-and-reception buffer 5 for normal printing and executes a drawing process based on the first print data.

As illustrated in FIG. 3B, when second print data having a higher priority is transmitted during the drawing process, the second print data is stored in the transmission-and-reception buffer 5 for interruption printing. The corresponding data interpretation section 4 interprets a command included in the second print data. As illustrated in FIG. 3B, when the command indicates interruption printing, the corresponding data interpretation section 4 writes the second print data into the drawing buffer 3, and the drawing section 2 executes a drawing process based on the second print data.

Meanwhile, as illustrated in FIG. 3C, when third print data is transmitted, the third print data is stored in the transmission-and-reception buffer 5 for reply. The corresponding data interpretation section 4 interprets a command included in the third print data and writes a reply command into the transmission-and-reception buffer 5 for reply.

Next, a processing procedure executed when print data is received according to RHPP during interruption printing is described with reference to FIG. 4.

At STEP1, the communication control section 6 receives print data and, at STEP2, checks statuses of the three transmission-and-reception buffers 5. At this time, the communication control section 6 checks whether or not print data are written in two of the three transmission-and-reception buffers 5, and thus determines whether or not interruption printing is being executed.

If interruption printing is being executed, at STEP3 the communication control section 6 writes the print data into the transmission-and-reception buffer 5 for reply. At STEP4, the communication control section 6 notifies the data interpretation section 4 of normal reception of the print data.

At STEP5, the data interpretation section 4 reads the print data from the transmission-and-reception buffer 5 and, at STEP6, checks whether or not the interruption printing is being executed. At this time, if the interruption printing is finished, the print data is processed as a normal or prioritized print request depending on the setting of priority level. Alternatively, if the interruption printing is being executed, at STEP7, the corresponding data interpretation section 4 writes a reply command into the transmission-and-reception buffer 5 for reply.

At STEP8, the communication control section 6 transmits the reply command to the host 12.

Next, an overall processing procedure is described with reference to FIG. 5.

FIG. 5 illustrates use of a protocol, for example, RHPP, in which bi-directional communication is needed between the printer 11 and the host 12. By contrast, in a case of using a protocol in which a bi-directional communication is not needed between the printer 11 and the host 12, while interruption printing is not being executed print data is stored in only the transmission-and-reception buffer 5 for normal printing. Further, since only one job is acceptable as the interruption printing at a time, only one job is stored in the transmission-and-reception buffer 5 for interruption printing. The transmission-and-reception buffer 5 for normal printing is capable of queuing up to its full capacity. The analyzed print data are not basically needed to store and thus, when the print data is analyzed, memory of a size corresponding to the size of the print data is freed in the transmission-and-reception buffer 5 for normal printing. When the reply command is transmitted, the print data stored in the transmission-and-reception buffer 5 for reply is immediately deleted and thus the transmission-and-reception buffer 5 is freed to receive subsequent print data. Such immediate freeing allows the printer 11 with less buffer memory to reply to the host 12 in a timely fashion.

In FIG. 5, at S1, print data is received and, at S2, the protocol in use is identified by the port number. At S3, it is checked whether or not all the three transmission-and-reception buffers 5 are free. If all the three transmission-and-reception buffers 5 are free, at S4 the print data is stored in the transmission-and-reception buffer 5 for normal printing. Alternatively, if only one or two transmission-and-reception buffers 5 are free, at S5, it is determined whether or not the interruption printing is requested.

If the interruption printing is not requested, the process goes to S4 and the print data is stored in the transmission-and-reception buffer 5 for normal printing. Alternatively, if the interruption printing is requested, at S6 it is checked whether or not two of the three transmission-and-reception buffers 5 are free.

If two of the three transmission-and-reception buffers 5 are free, at S7, the print data is stored in the transmission-and-reception buffer 5 for interruption printing. Alternatively, if only one of the three transmission-and-reception buffers 5 is free, at S8 the print data is stored in the transmission-and-reception buffer 5 for reply. At S9, the print data is analyzed.

Next, a processing procedure executed when print data is received according to RHPP during interruption printing is described with reference to FIG. 6. FIG. 6 illustrates details of the process executed when two of the three transmission-and-reception buffers 5 are not free at S6 in FIG. 5 ("NO" at S6).

At S1, the print data is stored in the transmission-and-reception buffer 5 for reply. When the corresponding data interpretation section 4 finishes reading the print data, the print data in the transmission-and-reception buffer 5 is overwritten with a certain value, for example, "−1", so as to be determinable whether or not the print data is left.

At S12, it is checked whether or not the interruption printing is finished. If the interruption printing is finished, at S13 a reply command indicating normal reception of a command from the host 12 is written into the transmission-and-reception buffer 5 for reply. Alternatively, if the interruption printing is not finished, at S14 a reply command indicating a busy state is written into the transmission-and-reception buffer 5 for reply.

At S15, the reply command is transmitted to the host 12.

As described above, according to the present exemplary embodiment, when receiving print data during executing interruption printing, the image forming apparatus stores the print data in the transmission-and-reception buffer 5 for reply and analyzes a command included in the print data. Further, when RHPP is used, the image forming apparatus transmits a reply command to the host 12. Thus, the image forming apparatus is capable of interpreting the command included in the print data and replying to the host 12 during execution of interruption printing.

Figure 7:
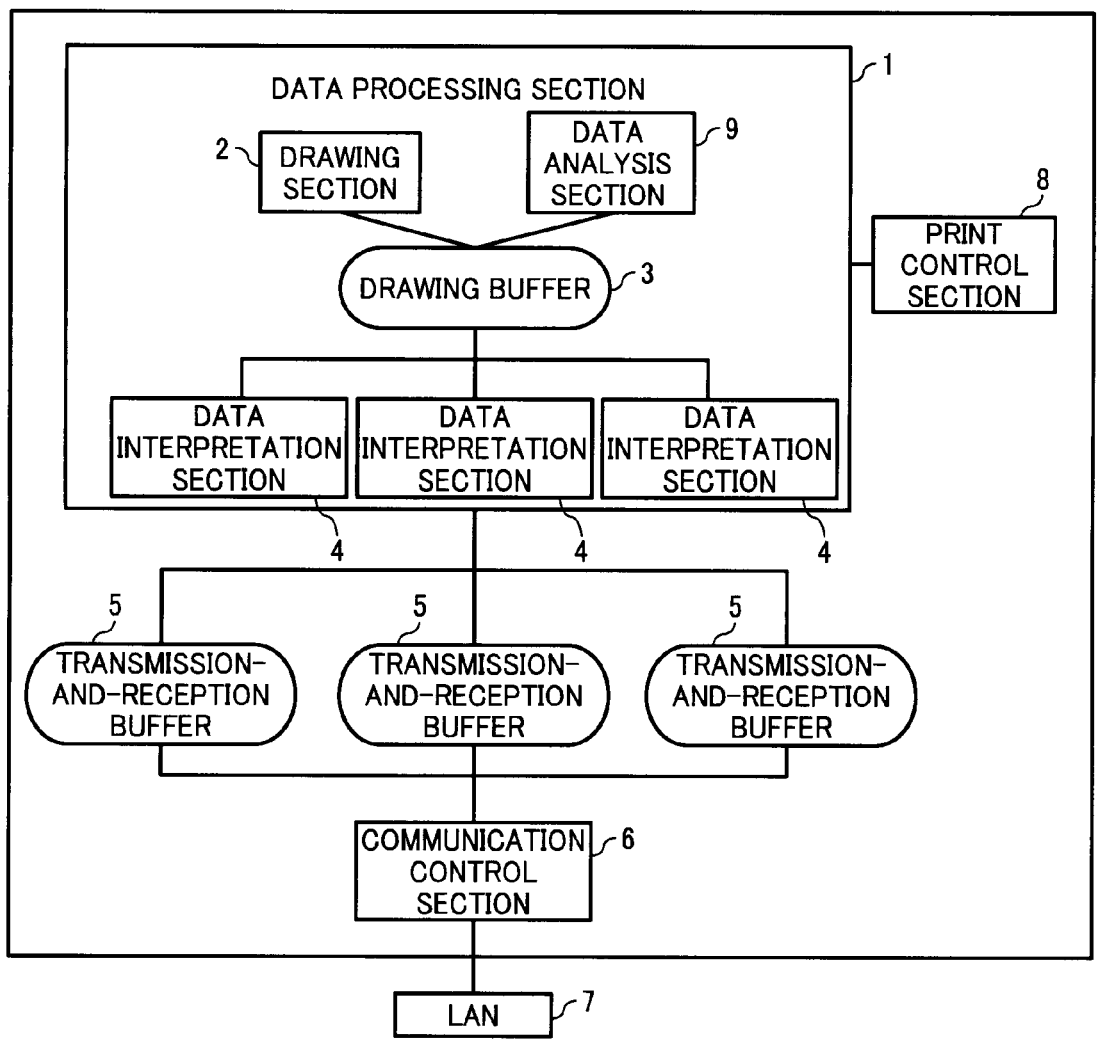
FIG. 7 is a block diagram illustrating a functional configuration of an image forming apparatus according to an exemplary embodiment.

FIG. 7 is a block diagram illustrating a functional configuration of an image forming apparatus according to another exemplary embodiment of the present invention. The hardware configuration of the image forming apparatus is identical to the hardware configuration of the image forming apparatus of FIG. 2A according to the above-described exemplary embodiment.

However, as illustrated in FIG. 7, in the image forming apparatus according to the present exemplary embodiment a data analysis section 9 is added to the functional configuration of the image forming apparatus of FIG. 2B. The data analysis section 9 acquires information on devices by analyzing commands described in, for example, PJL (print job language), and sets print conditions.

When print data is input from a host to a communication control section 6 via a LAN 7, the communication control section 6 identifies the protocol based on the port number designated in the received print data. If the port number is a certain port number, the protocol in use is identified as RHPP, and one data interpretation section 4 capable of interpreting RHPP commands interprets the print data stored in one transmission-and-reception buffer 5.

The data interpretation section 4 interprets the print data transmitted according to RHPP and writes a reply command to the transmission-and-reception buffer 5 for reply. Since the print data transmitted according to RHPP includes an RHPP command, a drawing buffer 3, communicating with a data analysis section 9 and a drawing section 2, stores the print data without the RHPP command therein. Thus, the print data is transferred to the data analysis section 9 and the drawing section 2 in such a form that the data analysis section 9 and the drawing section 2 can interpret the print data.

The data analysis section 9 analyzes print conditions based on the print data. The drawing section 2 executes a drawing process based on the print data and causes an engine to execute a printing process via a print control section 8.

As described above, the data interpretation section 4, which analyzes RHPP commands, and the data analysis section 9, which analyzes PJL commands, have similar functions. Accordingly, for example, when the host is a mainframe system in which a relatively high degree of reliability is needed, such a high degree of reliability can be more securely obtained by executing a printing process while verifying the progress of the printing process by executing a bi-directional communication between a printer and the host according to RHPP or other suitable protocol. By contrast, in a normal office environment, the printer may generally execute a printing process based on PJL rather than RHPP.

Since the data interpretation section 4 have similar functions with the data analysis section 9 as described above, only the data interpretation section 4 may be optionally operated while the functions of the data analysis section 9 are disabled. In such a case, unnecessary processes due to overlapping in function between the two sections can be omitted.

In one example method, the data analysis section 9 can be disabled without adding significant modifications to the process of the data analysis section 9 by preparing a dummy transmission-and-reception buffer for the data interpretation section 9 to write analysis results of print data into. One such a disabling method is illustrated in a flowchart of FIG. 8.

Figure 8:
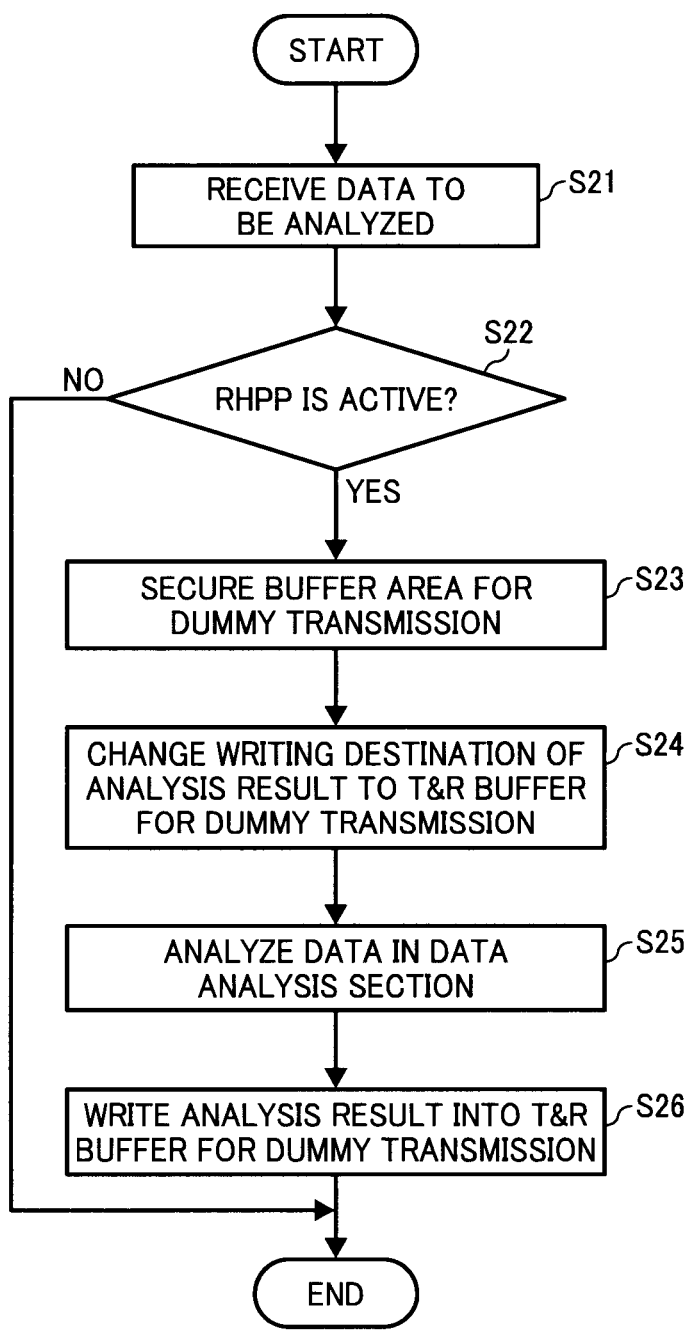
FIG. 8 is a flowchart illustrating a method of disabling a data analysis section of the image forming apparatus of FIG. 7.

As illustrated in FIG. 8, at S21 the communication control section 6 receives data to be analyzed. At S22, the data interpretation section 4 determines whether or not RHPP is active, that is, a printing process according to RHPP is requested. If RHPP is active ("YES" at S22), at S23 the data interpretation section 4 secures, in the drawing buffer 3, a buffer area into which to write analysis results of the data analysis section 9. At S24, the data interpretation section 4 changes the writing destination of the analysis results of the data analysis section 9 to a transmission-and-reception buffer for dummy transmission secured in, for example, the transmission-and-reception buffer for reply.

At S25, the data analysis section 9 analyzes print data and at S26 writes the analysis results of the print data to the transmission-and-reception buffer for dummy transmission. Since the transmission-and-reception buffer for dummy transmission is a buffer in which unused data is written, the data written in the transmission-and-reception buffer for dummy transmission is not transmitted to a host.

By contrast, the data analysis section 9 may be operated while the data interpretation section 4 is not functioned. For example, when a first system including the data interpretation section 9 is replaced with a second system including the data interpretation section 4 in an image forming apparatus, the data analysis section 9 may be left in the image forming apparatus, so that the second system, for example, RHPP system, including the data interpretation section 4 can be developed step by step while using the functions of the data analysis section 9.

Exemplary embodiments of the present invention may be conveniently implemented using a conventional general purpose digital computer programmed according to the teachings of the present specification, as will be apparent to those skilled in the computer art. Appropriate software coding can readily be prepared by skilled programmers based on the teachings of the present invention, as will be apparent to those skilled in the software art. Exemplary embodiments of the present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that, within the scope of the appended claims, the disclosure of this application may be practiced otherwise than as specifically described herein.

Further, elements and/or features of different exemplary embodiments and/or examples may be combined with each other and/or substituted for each other within the scope of this disclosure and appended claims.

Still further, any one of the above-described and other exemplary features of the present invention may be embodied in the form of an apparatus, method, system, computer program, or computer program product. For example, the aforementioned methods may be embodied in the form of a system or device, including, but not limited to, any of the structures for performing the methodology illustrated in the drawings.

Even further, any of the aforementioned methods may be embodied in the form of a program. The program may be stored on a computer readable medium and configured to perform any one of the aforementioned methods when run on a computer device (a device including a processor). Thus, the storage medium or computer readable medium can be configured to store information and interact with a data processing facility or computer device to perform the method of any of the above-described embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media (such as CD-ROMs and DVDs), magneto-optical storage media (such as MOs), magnetic storage media (including but not limited to floppy diskettes, cassette tapes, and removable hard disks), media with a built-in rewriteable non-volatile memory (including but not limited to memory cards), and media with a built-in ROM (including but not limited to ROM cassettes), etc. Furthermore, various information regarding stored images, for example, property information, may be stored in any other form, or provided in other ways.

Examples and embodiments being thus described, it should be apparent to one skilled in the art after reading this disclosure that the examples and embodiments may be varied in many ways. Such variations are not to be regarded as a departure from the spirit and scope of the present invention, and such modifications are not excluded from the scope of the following claims.

What is claimed is:

1. An image forming apparatus, connected to an information processing device via a network, comprising:
   a receiving unit configured to receive first print data via a first protocol in which bi-directional communication is not needed between the image forming apparatus and the information processing device and second print data via a second protocol in which bi-directional communication is needed between the image forming apparatus and the information processing device;
   a first buffer;
   a second buffer;
   a third buffer;
   a control unit configured to, on receiving print data, store the print data in the first buffer and print the print data, the control unit being configured to, on receiving a first interruption printing request while printing the print data stored in the first buffer, store first interruption print data in the second buffer and execute first interruption printing of the first interruption print data, and the control unit being configured to, on receiving a second interruption printing request during execution of the first interruption printing, store second interruption print data in the third buffer;
   a determining unit configured to determine whether or not the second interruption print data stored in the third buffer has been transmitted according to the second protocol; and
   a reply transmission unit configured to transmit a reply to the information processing device when the determining unit determines that the second interruption print data stored in the third buffer has been transmitted according to the second protocol.

2. The image forming apparatus according to claim further comprising:
   a communication control section including the receiving unit and the reply transmission unit.

3. The image forming apparatus according to claim 1, wherein the image forming apparatus includes a plurality of interpretation sections similarly constituted as an interpretation section, the plurality of interpretation sections corresponding to the first to third buffers, respectively.

4. The image forming apparatus according to claim 1, wherein an interpretation section determines whether or not the interruption printing is finished before the reply transmission unit transmits the reply to the information processing device.

5. The image forming apparatus according to claim 2, wherein the communication control section secures space for the third buffer when an amount of overall free space of memory is low.

6. The image forming apparatus according to claim 2, wherein the communication control section frees the third buffer after the reply transmission unit transmits the reply to the information processing device.

7. The image forming apparatus according to claim 1, wherein the third buffer is used as an area for storing the reply when a result of the third print data interpreted by an interpretation section indicates no need to transmit the reply to the information processing device.

8. A print control method used in an image forming apparatus that includes a first buffer, a second buffer, and a third buffer, the image forming apparatus being connected to an information processing device via a network, the method comprising:
   receiving first print data via a first protocol in which bi-directional communication is not needed between the image forming apparatus and the information processing device and second print data via a second protocol in which bi-directional communication is needed between the image forming apparatus and the information processing device;
   storing, upon receiving print data, the print data in the first buffer and printing the print data;
   storing, upon receiving a first interruption printing request while printing the print data stored in the first buffer, first interruption print data in the second buffer and executing first interruption printing of the first interruption print data;
   storing, upon receiving a second interruption printing request during execution of the first interruption printing, second interruption print data in the third buffer;
   determining, at a determining unit, whether or not the second interruption print data stored in the third buffer has been transmitted according to the second protocol; and
   transmitting, by a reply transmission unit, a reply to the information processing device when the determining unit determines that the second interruption print data stored in the third buffer has been transmitted according to the second protocol.

9. The print control method according to claim 8, further comprising:
   determining, between an interpreting of the third print data stored in the third buffer and the transmitting of the reply, whether or not second draw processing in accordance with the second print data stored in the second buffer is finished; and
   reflecting in the reply a result of determining whether or not the second draw processing in accordance with the second print data stored in the second buffer is finished.

10. The print control method according to claim 8, further comprising:
   freeing the third buffer after transmitting the reply to the information processing device.

* * * * *